United States Patent
Neumann et al.

(10) Patent No.: US 11,004,106 B2
(45) Date of Patent: May 11, 2021

(54) DEVICE AND METHOD FOR DATA PACKET PROCESSING

(71) Applicant: InterDigital CE Patent Holdings, SAS, Paris (FR)

(72) Inventors: Christoph Neumann, Rennes (FR); Stephane Onno, Saint Gregoire (FR); Olivier Heen, Domloup (FR); Siegfried Loeffler, Paris (FR)

(73) Assignee: InterDigital CE Patent Holdings, Paris (FR)

( * ) Notice: Subject to any disclaimer, the term of this patent is extended or adjusted under 35 U.S.C. 154(b) by 33 days.

(21) Appl. No.: 15/711,342

(22) Filed: Sep. 21, 2017

(65) Prior Publication Data

US 2018/0082327 A1 Mar. 22, 2018

(30) Foreign Application Priority Data

Sep. 22, 2016 (EP) .................................... 16306217

(51) Int. Cl.
*G06F 15/16* (2006.01)
*G06F 9/54* (2006.01)
(Continued)

(52) U.S. Cl.
CPC ..... *G06Q 30/0242* (2013.01); *G06Q 30/0201* (2013.01); *H04L 43/04* (2013.01);
(Continued)

(58) Field of Classification Search
CPC ....................................................... H04L 67/02
(Continued)

(56) References Cited

U.S. PATENT DOCUMENTS 7,103,616 B1 *  9/2006  Harmer ............... G06F 16/9574
8,037,097 B2 * 10/2011  Guo .................... H04L 29/1216
                                                                        707/792

(Continued)

FOREIGN PATENT DOCUMENTS

CN   103227791         4/2016
GB     2354854 A  *   4/2001   ......... G06F 21/6263
(Continued)

OTHER PUBLICATIONS

Olejnik et al., "Selling Off Privacy at Auction", Network and Distributed System Security Symposium (NDSS), San Diego, California, USA, Feb. 23, 2014, pp. 1-16.

(Continued)

*Primary Examiner* — Hamza N Algibhah
(74) *Attorney, Agent, or Firm* — Invention Mine LLC (57) ABSTRACT

In an Internet interface device such as a gateway managing a local network, a processor obtains a packet received from a device via a local network interface. The processor can determine whether or not the packet originates from a device in the local network deemed to be part of a particular group. The processor can also determine if the packet is addressed to an internet domain for which it stores identifying information in memory. In this case, the processor inspects the packet in search of a cookie. In case no cookie is found, the packet is output as is; if a cookie is found, the processor modifies cookie information in the packet by inserting a cookie specific to the Internet interface device, which results in a modified packet that then is output through the internet interface. Using the original cookie and the added cookie, it is possible to link cookies sent from different devices in the local network.

17 Claims, 3 Drawing Sheets

(51) Int. Cl.
*H04L 29/06* (2006.01)
*G06Q 30/02* (2012.01)
*H04L 29/08* (2006.01)
*H04L 12/26* (2006.01)

(52) U.S. Cl.
CPC ............ *H04L 67/146* (2013.01); *H04L 67/22* (2013.01); *H04L 67/306* (2013.01); *G06Q 30/0241* (2013.01); *H04L 63/0807* (2013.01); *H04L 67/02* (2013.01)

(58) Field of Classification Search
USPC ........................................................ 709/224
See application file for complete search history.

(56) References Cited

U.S. PATENT DOCUMENTS

| | | | |
|---|---|---|---|
| 8,495,195 B1* | 7/2013 | Abidogun | H04L 67/04 709/223 |
| 8,689,303 B1 | 4/2014 | Abidogun et al. | |
| 8,751,303 B2 | 6/2014 | Arini et al. | |
| 8,943,304 B2* | 1/2015 | He | H04L 63/08 713/151 |
| 9,232,014 B2 | 1/2016 | Duterque et al. | |
| 9,456,002 B2* | 9/2016 | Kelson | H04L 63/0281 |
| 9,864,671 B1* | 1/2018 | Amacker | H04L 67/2814 |
| 2002/0007317 A1* | 1/2002 | Callaghan | G06Q 30/0633 705/26.8 |
| 2003/0110212 A1* | 6/2003 | Lewis | H04L 29/06 709/203 |
| 2004/0049673 A1* | 3/2004 | Song | G06F 16/958 713/150 |
| 2008/0034417 A1* | 2/2008 | He | H04L 67/02 726/15 |
| 2008/0127323 A1* | 5/2008 | Soin | H04L 63/18 726/12 |
| 2009/0113532 A1* | 4/2009 | Lapidous | H04L 67/2804 726/7 |
| 2009/0172728 A1 | 7/2009 | Shkedi et al. | |
| 2009/0199285 A1* | 8/2009 | Agarwal | H04L 63/0281 726/9 |
| 2011/0208862 A1* | 8/2011 | Maffione | H04L 67/22 709/224 |
| 2011/0307580 A1 | 12/2011 | Fullett | |
| 2014/0259147 A1* | 9/2014 | L'Heureux | H04L 63/083 726/14 |
| 2014/0281031 A1* | 9/2014 | O'Connor | H04L 61/2007 709/245 |
| 2014/0365669 A1* | 12/2014 | Shamis | H04W 76/18 709/227 |
| 2015/0381656 A1* | 12/2015 | Kelson | H04L 63/0435 713/153 |

FOREIGN PATENT DOCUMENTS

| | | | | |
|---|---|---|---|---|
| GB | 2456864 | | 7/2009 | |
| WO | WO-0227552 A2 | * | 4/2002 | ......... H04L 67/2804 |

OTHER PUBLICATIONS

Bilodeau et al., "Dissecting Linux/Moose", ES ET, http://www.welivesecurity.com/wp-content/uploads/2015/05/Dissecting-LinuxMoose.pdf, May 2015, pp. 1-54.

Anonymous, "Privacy and Tracking in a Post-Cookie World", Interactive Advertising Bureau, https://www.iab.com/wp-content/uploads/2015/10/IABPPostCookieWhitepaper, Jan. 2014, 29 pages.

* cited by examiner

DEVICE AND METHOD FOR DATA PACKET PROCESSING

REFERENCE TO RELATED EUROPEAN APPLICATION

This application claims priority from European Patent Application No. 16306217.7, entitled "DEVICE AND METHOD FOR DATA PACKET PROCESSING", filed on Sep. 22, 2016, the contents of which are hereby incorporated by reference in its entirety.

TECHNICAL FIELD

The present disclosure relates generally to network communication and in particular to processing of packets comprising cookies.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

There are many reasons for tracking persons and usages on the Internet, for example to determine the effectiveness of advertisements on the Web. Current solutions for this generally rely on so-called cookies or authentication tokens, or a combination of the two.

Cookies are usually generated by advertising companies or marketing companies and then tracked by these same companies or by companies contracted to do so. For reasons of efficiency, it is desired to generate and track a single cookie per end user. The cookie approach has several limitations:

- The cookies are not linked to a user, but rather to a browser on a specific machine employed by the user. The cookies thus only allow tracking navigation on a particular browser and device; they cannot be used to track a person across several devices.
- The cookies cannot be used to link persons that belong to one family or household. It is thus not possible to generate profiles and ads targeted at the whole household.
- The cookies are specific to one company, which makes it difficult to merge information from cookies generated by two different companies.

To get around the latter drawback, it is possible to use a technique called 'cookie matching'. The objective of this technique is to link cookies from different companies that relate to the same browser, which allows merging profiles and a wider coverage in terms of tracking. This technique, however, does not allow to link cookies across distinct machines. Cookie matching is further described in "Selling Off Privacy at Auction" by Lukasz Olejnik, Tran Minh-Dung, Claude Castelluccia.

Another technique is 'access tokens' (using the terminology of OAuth, an open standard for authorization), which relate to an identity provided by so-called identity providers such as Facebook or Google. These tokens can be used as to track users and to link cookies that relate to the same identity. The authentication tokens allow tracking a person across several devices. While more powerful than cookie tracking, this technique still has some limitations:

- The identity providers cannot easily aggregate multiple identities of a single person or of a family.
- The user has to have used an identity provider such as Facebook or Google.

Cookies and access tokens may also be used to track and analyse the IP addresses from which a browser sending a cookie connects. This can provide an approximate estimation of the location of a user and may in some cases this may help to determine whether or not a user is at home. However, as many IP addresses are dynamic, it is not reliable information.

Another approach for linking cookies is based on the IP addresses used by the user's device. If several devices (and therefore cookies) connect using the same IP address, it is possible to create a link between the cookies and then aggregate the corresponding profiles. However, this method can be error prone: with some network architectures (enterprise networks, building networks, carrier grade Network Address Translation (NAT) . . . ), a single public IP address is shared by a large network. It can be seen that in case the IP address is used to link cookies, a link can be created between persons and profiles that have very little in common.

"Moose" is a worm that targets home gateways. Once installed on a home gateway, this worm tries to collect access tokens and cookies by inspecting outgoing traffic. The worm then sends the collected tokens and cookies to a repository from which they can be sold or used to generate fake likes or clicks. More information on Moose can be found in Olivier Bilodeau and Thomas Dupuy: "Dissecting Linux/Moose: The Analysis of a Linux Router-based Worm Hungry for Social Networks", May 2015—http://www.welivesecurity.com/wp-content/uploads/2015/05/Dissecting-LinuxMoose.pdf.

It will be appreciated that there is a desire for a solution that addresses at least some of the shortcomings of the conventional solutions. The present principles provide such a solution.

SUMMARY OF DISCLOSURE

In a first aspect, the present principles are directed to a gateway device that comprises a communication interface and at least one hardware processor configured to intercept a data packet produced by a device in a local network connected to the Internet interface device and received through the communication interface and targeted at an internet domain, and modify the data packet to include information indicating an association of the device in the local network to the Internet interface device.

Embodiments of the First Aspect Comprise

That the data packet includes a cookie identifying the device in the local network, the processor being configured to modify the data packet to include information indicating the association of the device in the local network to the Internet interface device by one of replacing the cookie identifying the device in the local network with a cooking identifying the Internet interface device and storing in the Internet interface device information indicating a link between the cookie identifying the device in the local network and the cookie identifying the Internet interface device, and adding a cookie identifying the Internet interface device to the data packet.

That the processor is further configured to maintain a list of internet domains and to modify the data packet only in case the internet domain at which the packet is targeted in included in the list of internet domains.

That the processor is further configured to modify the data packet only in response to determination that the device in the local network is part of a set of devices of a group. The group can be a household.

That the Internet interface device further comprises a second communication interface for outputting the data packet modified by the processor.

In a second aspect, the present principles are directed to a method for processing data packets at an Internet interface device comprising at least one hardware processor and a communication interface. The processor intercepts a data packet produced by a device in a local network connected to the Internet interface device, the data packet being received through the communication interface and targeted at an internet domain, and modifies the data packet to include information indicating an association of the device in the local network to the Internet interface device.

Embodiments of the Second Aspect Comprise

That the data packet includes a cookie identifying the device in the local network and the modifying is performed by doing one of replacing the cookie identifying the device in the local network with a cooking identifying the Internet interface device and storing in the Internet interface device information indicating a link between the cookie identifying the device in the local network and the cookie identifying the Internet interface device, and adding a cookie identifying the Internet interface device to the data packet.

That the processor maintains a list of internet domains, and the modifying is performed only in case the internet domain at which the packet is targeted in included in the list of internet domains.

That the modifying is performed only in response to determination that the device in the local network is part of a set of devices of a group. The group can be a household.

That the method further comprises outputting the data packet modified by the processor through a second communication interface.

In a third aspect, the present principles are directed to a computer program product which is stored on a non-transitory computer readable medium and comprises program code instructions executable by a processor for implementing the steps of a method according to the second aspect.

BRIEF DESCRIPTION OF DRAWINGS

Preferred features of the present principles will now be described, by way of non-limiting example, with reference to the accompanying drawings, in which.

DESCRIPTION OF EMBODIMENTS

Figure 1:
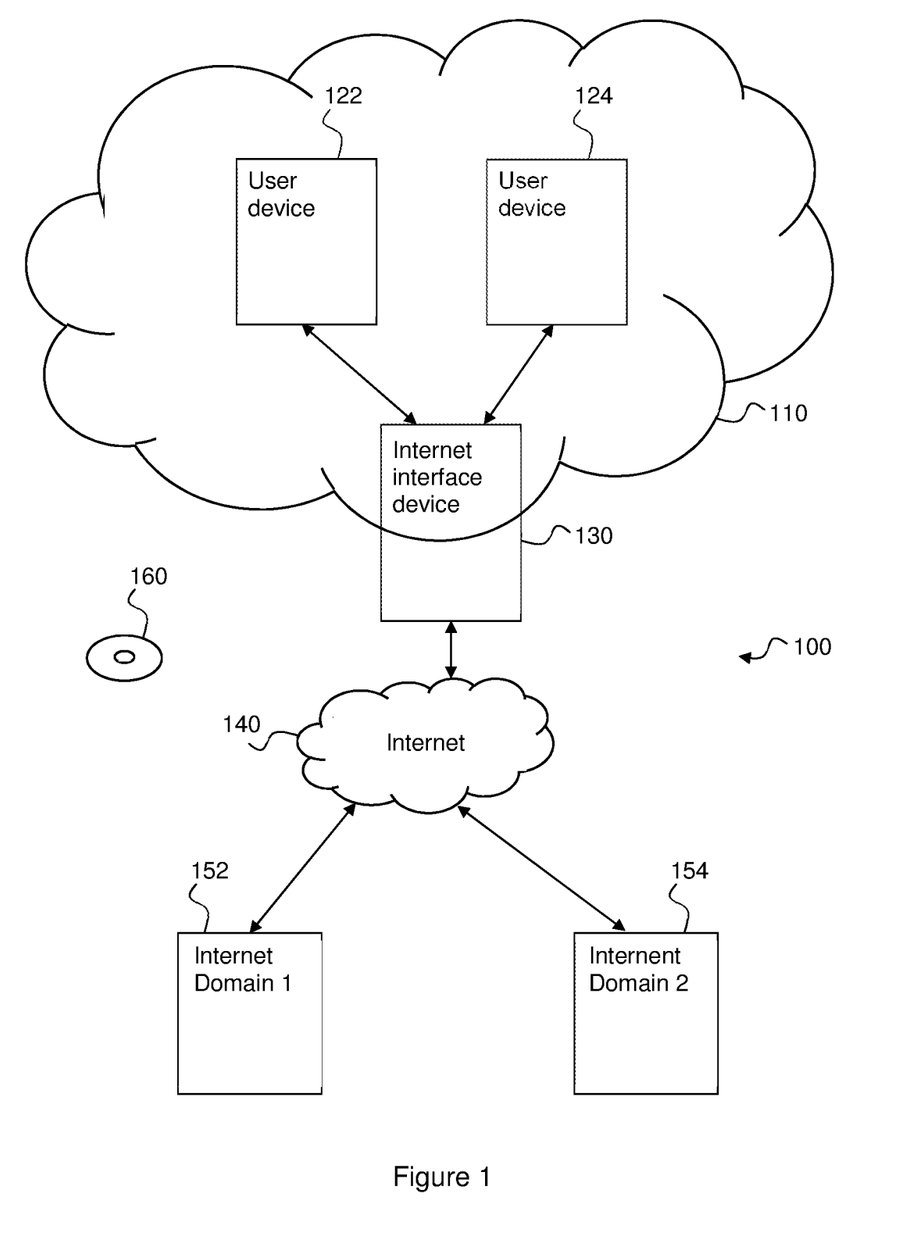
FIG. 1 illustrates a network comprising an Internet interface device according to the present principles.

FIG. 1 illustrates a network 100 comprising an Internet interface device according to the present principles. The network 100 comprises a local network 110, exemplified by a home network. The local network 110 comprises at least one device (for example a user device) 122, 124 connected to an Internet interface device (such as a gateway) 130 that directly or indirectly connects the devices 122, 124 to the Internet 140. A first and a second Internet domain are respectively illustrated by server 152 and server 154. For purposes of illustration, the first Internet domain has domain name ID1 and the second Internet domain ID2.

It will be understood that various implementations of the local network 110 may readily be imagined. The local network 110 may for example also be other kinds of networks such as a network of IoT devices connected by protocols such as Bluetooth Low Energy (BLE) or ZigBee or a local wireless network deployed in a car. Internet interface device 130 may also be a mobile phone that has shared its Internet connection with other devices using WiFi (tethering) or BLE and ZigBee. The devices 122, 124 may be smartphones, tablets, PCs or other conventional devices used to access the Internet.

Non-transitory storage media 160 stores a computer program with instructions that, when executed by a processor, performs the functions of the Internet interface device 130 as further described hereinafter with reference to FIG. 3.

Figure 2:
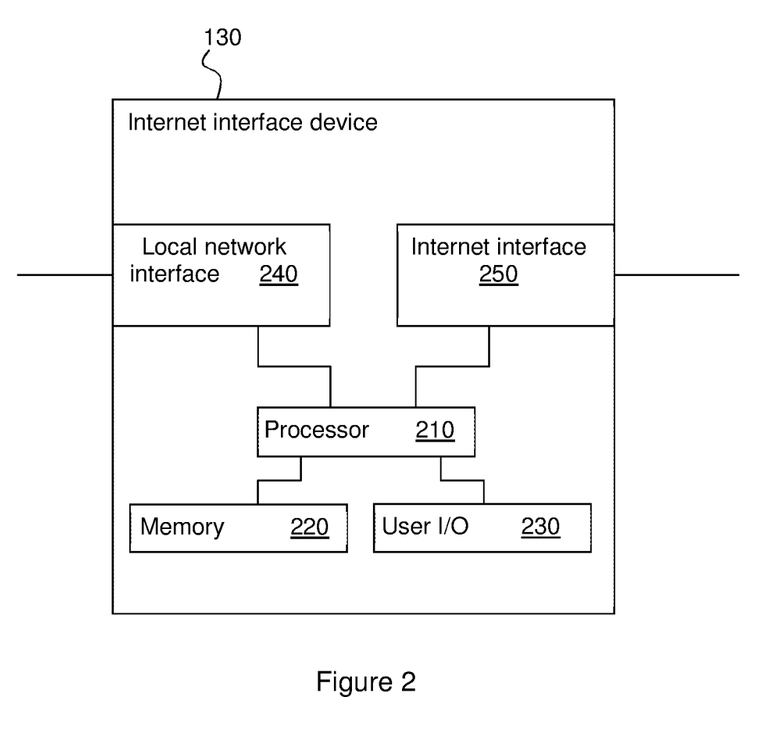
FIG. 2 illustrates an exemplary gateway according to the present principles.

FIG. 2 illustrates an exemplary Internet interface device 130 according to the present principles The Internet interface device 130 comprises at least one hardware processing unit ("processor") 210 configured to execute instructions of a first software program and to process outgoing IP packets, as will be further described hereinafter. The Internet interface device 130 further comprises at least one memory 220 (for example ROM, RAM and Flash or a combination thereof) configured to store the software program and data required to process outgoing packets. The Internet interface device 130 also comprises at least one user communications interface ("User I/O") 230 for interfacing with a user.

The Internet interface device 130 further comprises a first network interface 240 for interfacing with devices in the local network (110 in FIG. 1), preferably using WiFi, but other communication protocols such as Bluetooth or Ethernet are also possible. The Internet interface device 130 also comprises a second network interface 250 for interfacing with the Internet.

The Internet interface device 130 is preferably implemented as a single device, but its functionality can also be distributed over a plurality of devices.

The skilled person will appreciate that the Internet interface device 130 is very simplified for reasons of clarity and that a real Internet interface device in addition would comprise features such as internal connections and power supplies.

Figure 3:
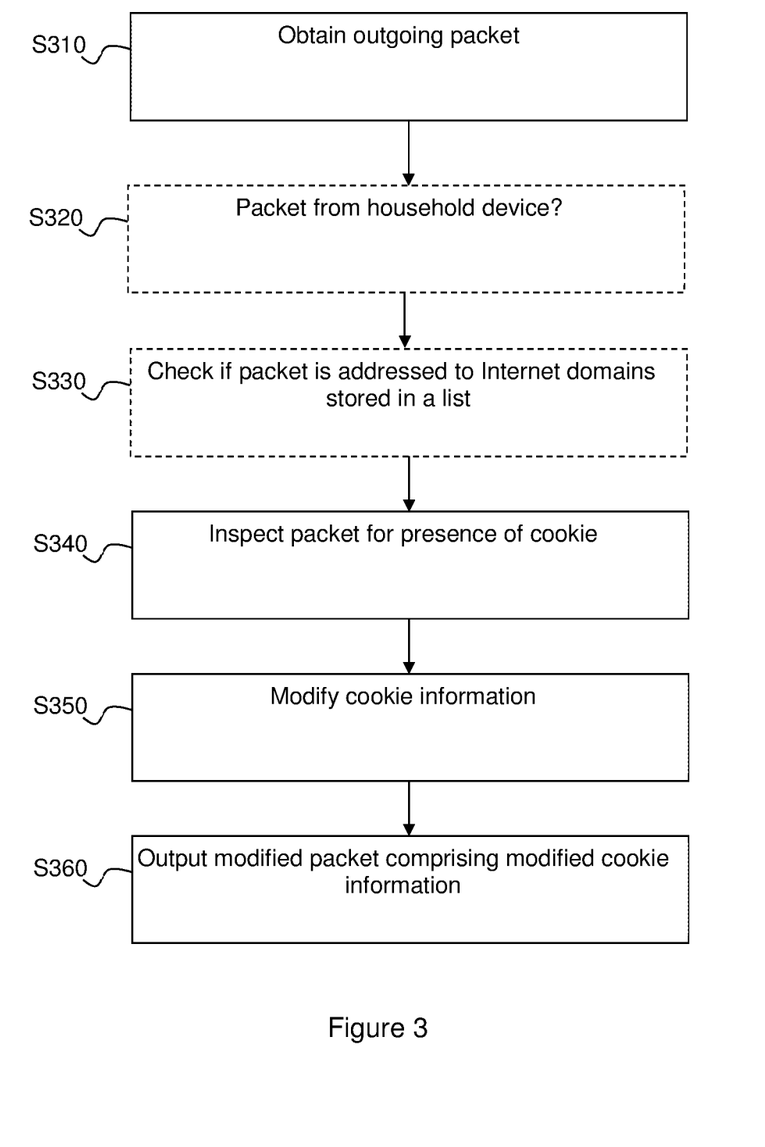
FIG. 3 illustrates a first method of packet processing according to the present principles.

FIG. 3 illustrates a first method of packet processing at an Internet interface device according to the present principles. In the description of FIG. 3, reference is also made to the features of the Internet interface device illustrated in FIG. 2.

In step S310, the processor 210 obtains a packet received from a device via the local network interface 240.

In optional step S320, the processor 210 determines whether or not the packet originates from a device that is deemed to be part of the household (as, for example, opposed to a guest in the local network 110). How this is done will be described hereinafter. In case the packet originates from a household device, the method continues in step S330; otherwise, the packet is output as is through Internet interface 250. It will be understood that other suitable groups may be used instead of "household", such as "IoT devices" or "car passengers".

In optional step S330, the processor 210 checks if the packet is addressed to an internet domain for which identifying information is stored in the memory 220. The identifying information can for example be an IP address or other information that permits identifying the addressee of the packet (e.g. using the Domain Name used in the Domain Name System (DNS) protocol, or by inspecting specific fields in a HyperText Transfer Protocol (HTTP) header). This step can be performed in order to limit the processing to packets addressed only to certain Internet domain, which can be done in order to perform the processing only for Internet domains who have requested, for example by subscription, the processing. The list of identifying information is maintained by the operator that provides the Internet interface device.

In case optional step S330 is used and the packet does not match any identifying information, then the packet is output. In any other case, the method proceeds with step S340.

In step S340, the processor 210 inspects the packet, for example using deep packet inspection (DPI, also known as for example complete packet inspection), in search of one or more cookies (also known as for example HTTP cookie, web cookie and Internet cookie). In case no cookie is found, the packet is output as is through Internet interface 250; if a cookie is found, the method proceeds with step S350.

An exemplary HTTP header with a cookie is:

```
GET /example.html HTTP/1.1
Host: 10.32.4.5
Accept */*
Accept-Language: en-us
Accept-Encoding: gzip, deflate
User-Agent: Mozilla/5.0 (iPad; U; CPU OS 3_2_1 like Mac
OS X; en-us)
Cookie: value1
```

In step S350, the processor 210 modifies the cookie information to insert into the packet a cookie specific to the Internet interface device 130 (and thus, by extension, specific to the local network 110). This results in a modified packet and can be done in a number of ways as will be described hereinafter.

To modify the cookie information, it is possible to use HTTP header enrichment, which allows to add information to an existing HTTP header. HTTP header enrichment is for example used by GSM/4G Internet interface devices to add the Mobile Subscriber ISDN (MS-ISDN) number to HTTP headers sent by the mobile phones connected to the Internet interface device.

A first way is to simply add a Internet interface device specific second cookie, "value2" (in bold for illustrative purposes), after the existing cookie, "value1":

```
GET /example.html HTTP/1.1
Host: 10.32.4.5
Accept */*
Accept-Language: en-us
Accept-Encoding: gzip, deflate
User-Agent: Mozilla/5.0 (iPad; U; CPU OS 3_2_1 like Mac
OS X; en-us)
Cookie: value1; value2
```

A second way is to add a specific HTTP field, for example "Home-cookie", with the Internet interface device specific second cookie, "value2" (in bold for illustrative purposes), after the existing HTTP field "Cookie":

```
GET /example.html HTTP/1.1
Host: 10.32.4.5
Accept */*
Accept-Language: en-us
Accept-Encoding: gzip, deflate
```

```
User-Agent: Mozilla/5.0 (iPad; U; CPU OS 3_2_1 like Mac
OS X; en-us)
Cookie: value1;
Home-cookie: value2
```

A third way is to replace the existing cookie, "value1", with an Internet interface device specific cookie, "value3" (in bold for illustrative purposes). In this case, the link between the existing cookie, "value1", and the Internet interface device specific cookie, "value3", is sent through a separate connection to the Internet domain. In this case, the exemplary HTTP header is:

```
GET /example.html HTTP/1.1
Host: 10.32.4.5
Accept */*
Accept-Language: en-us
Accept-Encoding: gzip, deflate
User-Agent: Mozilla/5.0 (iPad; U; CPU OS 3_2_1 like Mac
OS X; en-us)
Cookie: value3
```

The processor 210 can optionally also update an internal database for correlating users/devices (e.g., through the MAC addresses) and cookies in order to group the devices of a group, for example a household and their cookies.

In step S360, the modified packet is output through the Internet interface 250.

It will be understood that using the original cookie and the added cookie, it is possible to link all cookies sent from the local network.

As already described, in step S320, the processor 210 can determine whether or not the packet originates from a device that is deemed to be part of the household. To achieve this, the Internet interface device 130 monitors the MAC addresses of devices that are connected and of wireless devices that are in the vicinity of the Internet interface device without being connected. (In the latter case, identification is based on probe requests/MAC addresses as is known in the art). The Internet interface device 130 can then for example differentiate between devices that are connected only occasionally (e.g., from visitors) from personal devices that are connected frequently (and thus likely to belong to the household). In the simplest case, a threshold is used to define the level of "presence" of a device that is needed to consider the device as a "household device". As an example, this decision can be implemented based on devices that connect at regular intervals: e.g., devices that establish a connection at least once every weekday including the weekend can be identified as being likely to belong to the household, while a device that connects every day except during the weekend can be identified to belong to somebody servicing the same family. Another rule can be that devices that are connected for a significant period—e.g., devices that are present in the local network for more than 4 hours every day—are likely to belong to the household.

After checking the information gathered this way, the Internet interface device 130 can decide, with a certain level of accuracy, if it the packet originated at a device that should be considered part of the household. In this case, as mentioned, the Internet interface device modifies the cookie information.

Through the use of the present principles, it is possible for an Internet domain to receive cookies from a different household devices/browsers and then, using the cookie specific to the Internet interface device, link all the device/browser specific cookies of the local network, thus allowing to build a complete home profile.

Further, packets sent by household devices that connect through the local network comprise Internet interface device specific cookies, while household devices connect from the outside do not. This can make it possible to determine whether the household device is currently in the local network or not.

The description herein has made use of the expression "cookie", which is intended to cover various types of cookies and identifiers such as flash-cookies.

It will be appreciated that the present principles can provide a solution for packet processing that can enable to:
  link cookies sent from devices of the same household;
  determine whether a household device connects from the local network or from the outside;

The present principles can be used as part of a solution for user tracking, marketing and ad placement on the Internet. It is also noted that the present principles do not require a user to create an identity; there is thus no need for an identity provider.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The invention claimed is:

1. An internet interface device comprising:
  a communication interface; and
  at least one hardware processor configured to:
    intercept a data packet produced by a device in a local network connected to the Internet interface device, wherein the data packet is received through the communication interface and is targeted at an internet domain, and wherein the data packet includes original cookie information that includes a first cookie identifying the device in the local network;
    determine whether the device in the local network is part of a set of devices of a group based on a determination whether the device has a threshold level of presence in the local network that is needed for the device to be considered part of the set of devices of the group; and
    only in response to a determination that the device in the local network is part of the set of devices of the group, modify, in the data packet, the original cookie information including the first cookie identifying the device in the local network such that modified cookie information includes a second cookie identifying the Internet interface device.

2. The Internet interface device of claim 1, wherein the at least one hardware processor is configured to modify the original cookie information including the first cookie identifying the device in the local network such that modified cookie information includes the second cookie identifying the Internet interface device by one of:
  replacing, in the original cookie information, the first cookie identifying the device in the local network with the second cookie identifying the Internet interface device, and storing in the Internet interface device information indicating a link between the first cookie identifying the device in the local network and the second cookie identifying the Internet interface device; and adding the second cookie identifying the Internet interface device to the original cookie information that also includes the first cookie identifying the device in the local network.

3. The Internet interface device of claim 1, wherein the at least one hardware processor is further configured to maintain a list of internet domains, and to modify the original cookie information in the data packet further only in case the internet domain at which the packet is targeted is included in the list of internet domains.

4. The Internet interface device of claim 1, wherein the group is a household.

5. The Internet interface device of claim 1, further comprising a second communication interface for outputting the data packet including the modified cookie information.

6. The Internet interface device of claim 1, wherein the group is a group of IoT devices or a group of car passengers.

7. A method for processing data packets at an Internet interface device comprising at least one hardware processor and a communication interface, the method comprising:

intercepting, by the at least one hardware processor, a data packet produced by a device in a local network connected to the Internet interface device, wherein the data packet is received through the communication interface and is targeted at an internet domain, and wherein the data packet includes original cookie information that includes a first cookie identifying the device in the local network;

determining, by the at least one hardware processor whether the device in the local network is part of a set of devices of a group based on a determination whether the device has a threshold level of presence in the local network that is needed for the device to be considered part of the set of devices of the group; and only in response to a determination that the device in the local network is part of the set of devices of the group, modifying, by the at least one hardware processor, in the data packet, the original cookie information including the first cookie identifying the device in the local network such that modified cookie information includes a second cookie identifying the Internet interface device.

8. The method of claim 7, wherein the modifying is performed by doing one of:

replacing, in the original cookie information, the first cookie identifying the device in the local network with the second cookie identifying the Internet interface device, and storing in the Internet interface device information indicating a link between the first cookie identifying the device in the local network and the second cookie identifying the Internet interface device; and adding the second cookie identifying the Internet interface device to the original cookie information that also includes the first cookie identifying the device in the local network.

9. The method of claim 7, wherein the method further includes maintaining, by the at least one hardware processor, a list of internet domains, and wherein the modifying is performed further only in case the internet domain at which the data packet is targeted is included in the list of internet domains.

10. The method of claim 7, wherein the group is a household.

11. The method of claim 7, further comprising outputting, through a second communication interface, the data packet including the modified cookie information.

12. The method of claim 7, wherein the group is a group of IoT devices or a group of car passengers.

13. A non-transitory computer readable medium storing computer code product comprising program code instructions executable by at least one hardware processor for implementing a method including:

intercepting, by the at least one hardware processor, a data packet produced by a device in a local network connected to the Internet interface device, wherein the data packet is received through the communication interface and is targeted at an internet domain, and wherein the data packet includes original cookie information that includes a first cookie identifying the device in the local network;

determining, by the at least one hardware processor, whether the device in the local network is part of a set of devices of a group based on a determination whether the device has a threshold level of presence in the local network that is needed for the device to be considered part of the set of devices of the group; and only in response to a determination that the device in the local network is part of the set of devices of the group, modifying, by the at least one hardware processor, in the data packet, the original cookie information including the first cookie identifying the device in the local network such that modified cookie information includes a second cookie identifying the Internet interface device.

14. An internet interface device comprising:
a communication interface; and
at least one hardware processor configured to:

intercept a data packet produced by a device in a local network connected to the Internet interface device, wherein the data packet is received through the communication interface and is targeted at an internet domain, and wherein the data packet includes original cookie information that includes a first cookie identifying the device in the local network;

determine whether the device in the local network is a device that is part of a set of devices belonging to a group, the group being a household, based on a determination of how often the device is connected to the Internet interface device; and only in response to a determination that the device in the local network is part of the set of devices belonging to the household, modify, in the data packet, the original cookie information including the first cookie identifying the device in the local network such that modified cookie information includes a second cookie identifying the Internet interface device.

15. The Internet interface device of claim 14, wherein the at least one hardware processor is further configured to determine whether the device in the local network is the device belonging to the household based on a determination of one of: (i) how often and when the device is connected to the Internet interface device, and (ii) how often and for how long the device is connected to the Internet interface device.

16. A method for processing data packets at an Internet interface device comprising at least one hardware processor and a communication interface, the method comprising:

intercepting, by the at least one hardware processor, a data packet produced by a device in a local network connected to the Internet interface device, wherein the data packet is received through the communication interface and is targeted at an internet domain, and wherein the data packet includes original cookie information that includes a first cookie identifying the device in the local network;

determining, by the at least one hardware processor, whether the device in the local network is a device that is part of a set of devices belonging to a group, the group being a household, based on a determination of how often the device is connected to the Internet interface device; and only in response to a determination that the device in the local network is part of the set of devices belonging to the household, modifying, by the at least one hardware processor, in the data packet, the original cookie information including the first cookie identifying the device in the local network such that modified cookie information includes a second cookie identifying the Internet interface device.

17. The method of claim 16, wherein determining, by the at least one hardware processor, whether the device in the local network is the device belonging to the household is further based on a determination of one of: (i) how often and when the device is connected to the Internet interface device, and (ii) how often and for how long the device is connected to the Internet interface device.

* * * * *